(12) United States Patent
Lai

(10) Patent No.: US 12,438,362 B2
(45) Date of Patent: Oct. 7, 2025

(54) ELECTROSTATIC DISCHARGE TRIGGER CIRCUIT USING VOLTAGE DETECTION CIRCUIT TO DETECT OCCURRENCE OF ELECTROSTATIC DISCHARGE EVENT AND ASSOCIATED METHOD

(71) Applicant: MEDIATEK INC., Hsin-Chu (TW)

(72) Inventor: Po-Ya Lai, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 184 days.

(21) Appl. No.: 18/220,282

(22) Filed: Jul. 11, 2023

(65) Prior Publication Data

US 2024/0063633 A1 Feb. 22, 2024

Related U.S. Application Data

(60) Provisional application No. 63/371,643, filed on Aug. 17, 2022.

(51) Int. Cl.
*H02H 9/04* (2006.01)

(52) U.S. Cl.
CPC .................................. *H02H 9/046* (2013.01)

(58) Field of Classification Search
CPC ........... H02H 9/046; H02H 9/041; H02H 1/00
USPC .......................................................... 361/56
See application file for complete search history.

(56) References Cited

U.S. PATENT DOCUMENTS

| | | | |
|---|---|---|---|
| 5,625,280 A | 4/1997 | Voldman | |
| 6,862,161 B2 | 3/2005 | Woo | |
| 7,274,545 B2 | 9/2007 | Marum | |
| 7,446,990 B2 | 11/2008 | Miller | |
| 9,553,446 B2* | 1/2017 | Gerdemann | ........... H02H 9/046 |
| 9,634,483 B2* | 4/2017 | Huang | .................... H02H 9/041 |
| 9,871,373 B2 | 1/2018 | O'Donnell | |
| 10,826,291 B2 | 11/2020 | Xavier | |
| 10,965,118 B2* | 3/2021 | Ma | ........................ H02H 9/046 |
| 2002/0030955 A1* | 3/2002 | Woo | ...................... H02H 9/046 361/56 |
| 2005/0275989 A1 | 12/2005 | Chen | |
| 2009/0040678 A1 | 2/2009 | Yang | |
| 2014/0092508 A1 | 4/2014 | Ko | |
| 2016/0126729 A1* | 5/2016 | Gerdemann | ........... H02H 9/046 361/56 |
| 2016/0172845 A1* | 6/2016 | Parris | ..................... H02H 9/046 361/56 |

(Continued)

FOREIGN PATENT DOCUMENTS

| | | |
|---|---|---|
| CN | 102545922 B | 9/2014 |
| CN | 109217276 A | 1/2019 |

(Continued)

*Primary Examiner* — Dharti H Patel
(74) *Attorney, Agent, or Firm* — Winston Hsu

(57) ABSTRACT

An electrostatic discharge (ESD) trigger circuit includes a voltage detection circuit and a trigger circuit. The voltage detection circuit is used to detect occurrence of an ESD event on an ESD-protected supply voltage according to the ESD-protected supply voltage and an additional supply voltage, and assert an enable signal in response to the ESD event being detected on the ESD-protected supply voltage, wherein the additional supply voltage is independent of the ESD-protected supply voltage. The trigger circuit is used to control activation of ESD protection for the ESD-protected supply voltage according to the enable signal.

10 Claims, 12 Drawing Sheets

(56) References Cited

U.S. PATENT DOCUMENTS

2017/0126001 A1\* 5/2017 Altaras .................... H02H 9/04
2018/0047720 A1\* 2/2018 Lai ....................... H10D 89/601
2019/0341772 A1 11/2019 Hsu

FOREIGN PATENT DOCUMENTS

CN 111199966 A 5/2020
EP 3382758 A1 \* 10/2018 ............. H01L 23/60
WO WO-0207284 A1 \* 1/2002 ............. H02H 9/046

\* cited by examiner

ELECTROSTATIC DISCHARGE TRIGGER CIRCUIT USING VOLTAGE DETECTION CIRCUIT TO DETECT OCCURRENCE OF ELECTROSTATIC DISCHARGE EVENT AND ASSOCIATED METHOD

CROSS REFERENCE TO RELATED APPLICATIONS

This application claims the benefit of U.S. Provisional Application No. 63/371,643, filed on Aug. 17, 2022. The content of the application is incorporated herein by reference.

BACKGROUND

The present invention relates to electrostatic discharge (ESD) protection, and more particularly, to an ESD trigger circuit that uses a voltage detection circuit to detect occurrence of an ESD event on an ESD-protected supply voltage and an associated method.

Protection against ESD is part of Electro Magnetic Compatibility (EMC) requirements. It is the ability for equipment to properly operate in its electromagnetic environment by limiting the reception of electromagnetic energy that may cause physical damage. A frequency-detection-based ESD trigger circuit is a common methodology and is usually used for Human-Body Model (HBM)/Charged-Device Model (CDM) event protection. However, the frequency-detection-based ESD trigger circuit is unable to detect occurrence of long-duration ESD pulses. Thus, there is a need for an innovative ESD trigger circuit which is capable of covering slow ESD events (i.e., long-duration ESD pulses) and/or fast ESD events (i.e., short-duration ESD pulses).

SUMMARY

One of the objectives of the claimed invention is to provide an ESD trigger circuit that uses a voltage detection circuit to detect occurrence of an ESD event (e.g., a slow ESD event) on an ESD-protected supply voltage and an associated method.

According to a first aspect of the present invention, an exemplary ESD trigger circuit is disclosed. The exemplary ESD trigger circuit includes a voltage detection circuit and a trigger circuit. The voltage detection circuit is arranged to detect occurrence of an ESD event on an ESD-protected supply voltage according to the ESD-protected supply voltage and an additional supply voltage, and assert an enable signal in response to the ESD event being detected on the ESD-protected supply voltage, wherein the additional supply voltage is independent of the ESD-protected supply voltage. The trigger circuit is arranged to control activation of ESD protection for the ESD-protected supply voltage according to the enable signal.

According to a second aspect of the present invention, an exemplary ESD triggering method is disclosed. The exemplary ESD triggering method includes: detecting occurrence of an ESD event on an ESD-protected supply voltage according to the ESD-protected supply voltage and an additional supply voltage, wherein the additional supply voltage is independent of the ESD-protected supply voltage; asserting an enable signal in response to the ESD event being detected on the ESD-protected supply voltage; and controlling activation of ESD protection for the ESD-protected supply voltage according to the enable signal.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
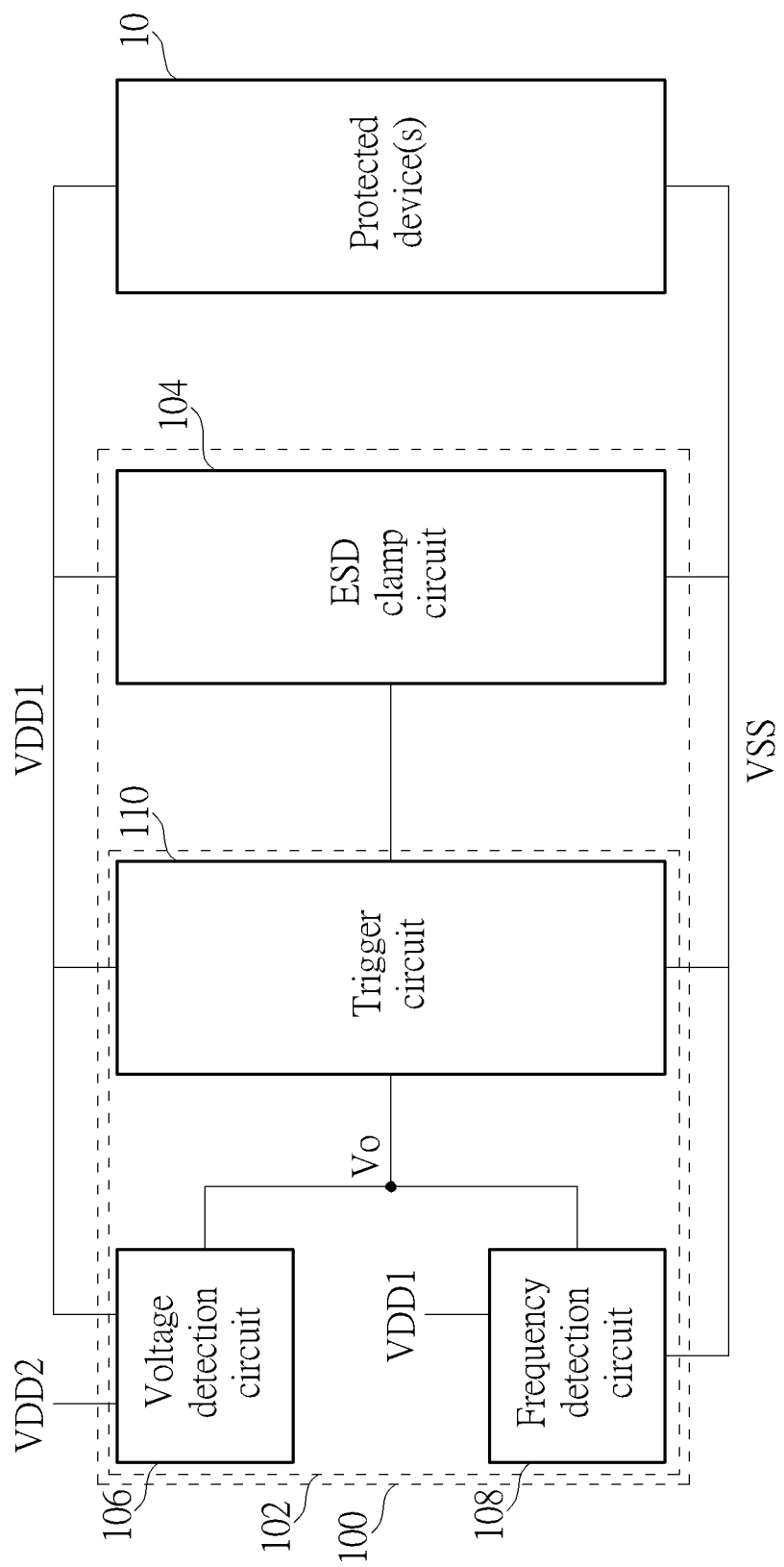
FIG. 1 is a diagram illustrating an ESD protection apparatus according to an embodiment of the present invention.

FIG. 1 is a diagram illustrating an ESD protection apparatus according to an embodiment of the present invention. The ESD protection apparatus 100 is used to provide ESD protection for one or more protected devices 10 coupled between an ESD-protected supply voltage VDD1 and a ground voltage VSS, and may include an ESD trigger circuit 102 and an ESD clamp circuit 104. In this embodiment, the ESD trigger circuit 102 may include a voltage detection circuit 106, a frequency detection circuit 108, and a trigger circuit 110. The voltage detection circuit 106 is arranged to detect occurrence of a first-type ESD event (e.g., a slow ESD event resulting from a long-duration ESD pulse) on the ESD-protected supply voltage VDD1 according to the ESD-protected supply voltage VDD1 and an additional supply voltage VDD2, and assert an enable signal Vo in response to the first-type ESD event being detected on the ESD-protected supply voltage VDD1. Please note that the additional supply voltage VDD2 is independent of the ESD-protected supply voltage VDD1. In other words, ESD pulse detection performed by the voltage detection circuit 106 is not solely based on the ESD-protected supply voltage VDD1. Due to the use of the additional supply voltage VDD2 that is independent of the ESD-protected supply voltage VDD1, ESD turn-on voltage can be adjusted precisely. Further details of the voltage detection circuit 106 will be described as below with reference to the accompanying drawings.

Figure 2:
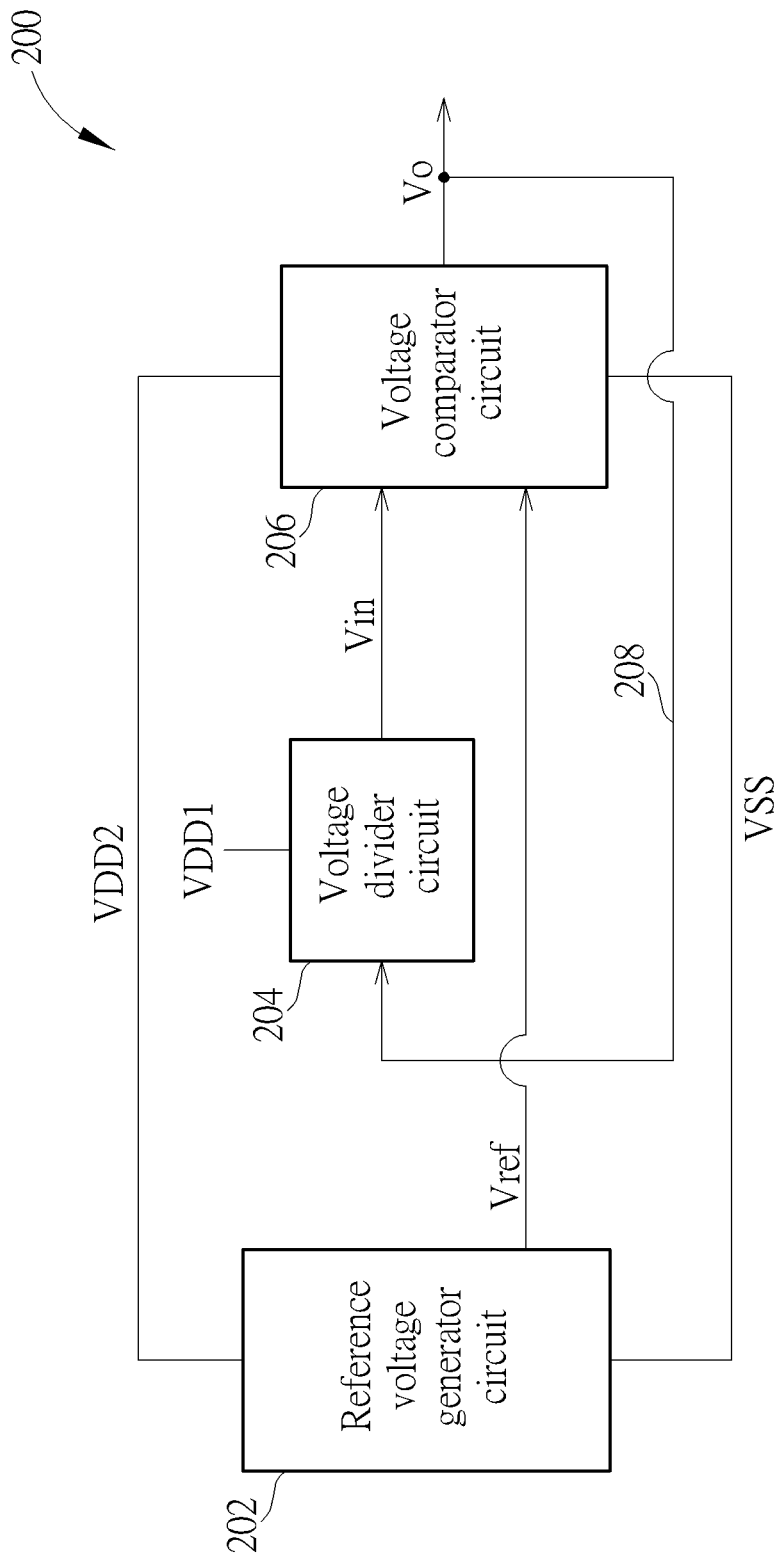
FIG. 2 is a diagram illustrating a first voltage detection circuit design according to an embodiment of the present invention.

FIG. 2 is a diagram illustrating a first voltage detection circuit design according to an embodiment of the present invention. The voltage detection circuit 106 shown in FIG. 1 may be implemented using the voltage detection circuit 200 shown in FIG. 2. As shown in FIG. 2, the voltage detection circuit 200 includes a reference voltage generator circuit 202, a voltage divider circuit 204, a voltage comparator circuit 206, and an optional feedback path 208. The reference voltage generator circuit 202 is arranged to generate a reference voltage Vref as an ESD detection threshold according to the additional supply voltage VDD2, where the reference voltage Vref is lower than the supply voltage VDD2 and higher than the ground voltage VSS. Since the reference voltage generator circuit 202 operates in the VDD2 power domain that is independent of the VDD1 power domain, the setting of the reference voltage Vref (which acts as the ESD detection threshold) is not affected by ESD events on the supply voltage VDD1, and can be adjusted precisely to meet the requirement.

The voltage divider circuit 204 is arranged to generate a divided voltage according to the ESD-protected supply voltage VDD1 and a divider ratio DR, and output the divided voltage as an input voltage Vin of the voltage comparator circuit 206. That is, Vin=VDD1×DR, where 0<DR<1. By way of example, but not limitation, the divider ratio DR may be programmable, thereby allowing an ESD turn-on condition to be dynamically adjusted. For example, the reference voltage Vref becomes a constant voltage after a voltage level of the reference voltage Vref is determined by the reference voltage generator circuit 202. Hence, by tuning the divider ratio DR of the voltage divider circuit 204, the input voltage Vin that appears at one input node of the voltage comparator circuit 206 varies under the same voltage level of the ESD-protected supply voltage VDD1. When the divider ratio DR is set by a first value, ESD protection is not activated unless the ESD-protected supply voltage VDD1 is higher than a first voltage threshold. When the divider ratio DR is set by a second value different from the first value, ESD protection is not activated unless the ESD-protected supply voltage VDD1 is higher than a second voltage threshold that is different from the first voltage threshold. The use of the voltage divider circuit 204 enables tuning of the ESD detection criterion under a condition that the reference voltage Vref is constant.

The voltage comparator circuit 206 is arranged to set the enable signal Vo by comparing the input voltage Vin and the reference voltage Vref. Since the input voltage Vin is derived from the ESD-protected supply voltage VDD1, the first-type ESD event (e.g., slow ESD event) on the ESD-protected supply voltage VDD1 can be detected by the voltage comparator circuit 206 when the input voltage Vin is higher than the reference voltage Vref. Specifically, the enable signal Vo is asserted by the voltage comparator circuit 206 (e.g., Vo=HIGH) when the input voltage Vin is higher than the reference voltage Vref.

In this embodiment, the voltage detection circuit 106 supports hysteresis in the ESD protection on/off control, such that the condition of asserting the enable signal Vo for activating ESD protection (e.g., ESD clamp circuit 104) can be different from the condition of de-asserting the enable signal Vo for deactivating ESD protection (e.g., ESD clamp circuit 104). Specifically, the enable signal Vo is received by the voltage divider circuit 204 via a feedback path 208. In this embodiment, the enable signal Vo is de-asserted by the voltage comparator circuit 206 (e.g., Vo=LOW) when the input voltage Vin is no longer higher than the reference voltage Vref. After the enable signal Vo is asserted (e.g., Vo=HIGH), the divider ratio can adjusted for delaying the timing of de-asserting the enable signal Vo (i.e., extending a period in which ESD protection, such as ESD clamp, is in operation). However, this is for illustrative purposes only, and is not meant to be a limitation of the present invention. In one alternative design, the feedback path 208 between the voltage comparator circuit 206 and the voltage divider circuit 204 may be omitted.

Figure 3:
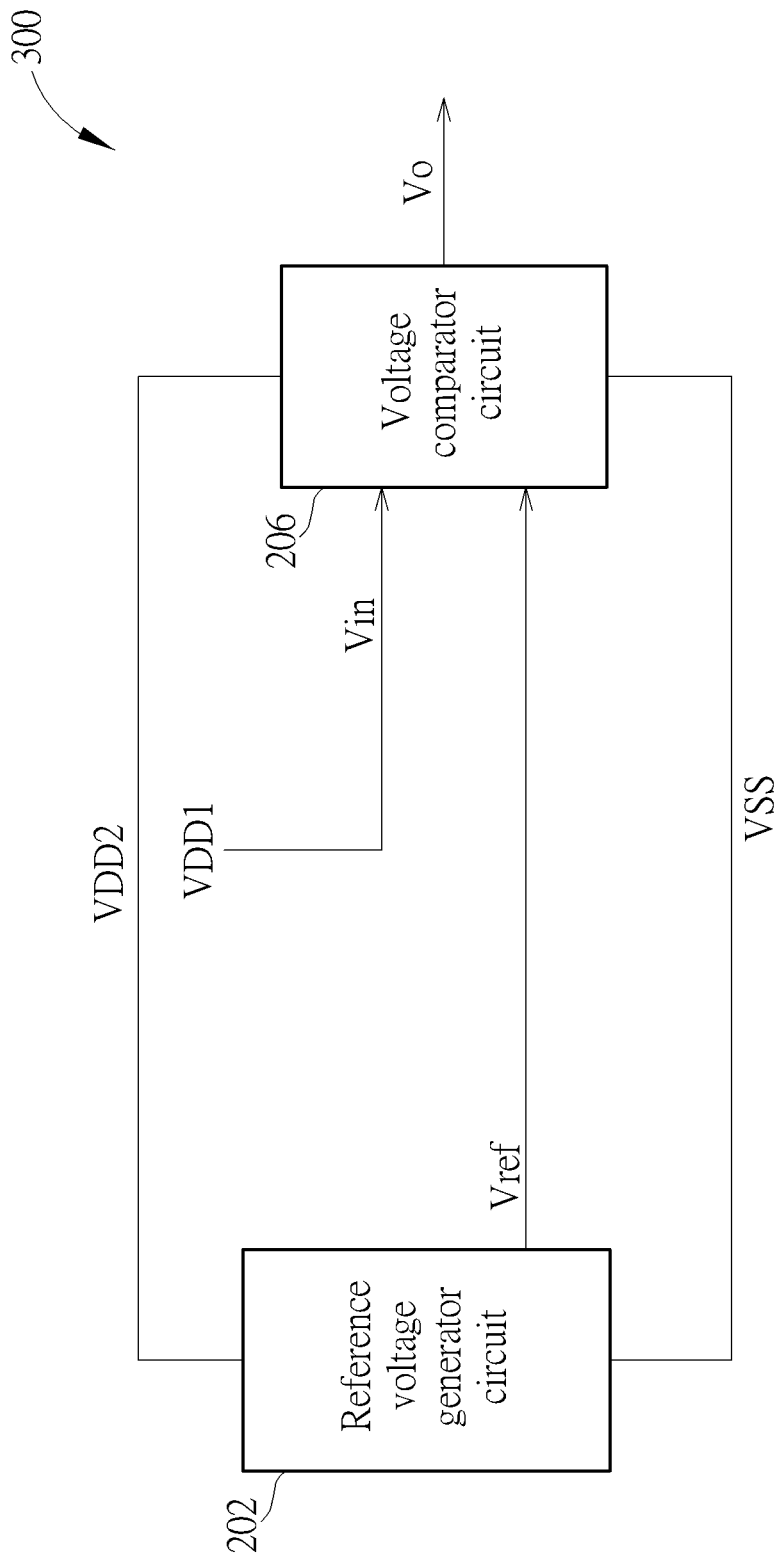
FIG. 3 is a diagram illustrating a second voltage detection circuit design according to an embodiment of the present invention.

As mentioned above, the ESD turn-on voltage can be tuned by the programmable divider ratio of the voltage divider circuit 204. However, this is for illustrative purposes only, and is not meant to be a limitation of the present invention. In practice, the voltage divider circuit 204 may be optional. FIG. 3 is a diagram illustrating a second voltage detection circuit design according to an embodiment of the present invention. The voltage detection circuit 106 shown in FIG. 1 may be implemented using the voltage detection circuit 300 shown in FIG. 3. In this embodiment, the input voltage Vin of the voltage comparator circuit 206 is directly set by the ESD-protected supply voltage VDD1 (i.e., Vin=VDD1). Hence, the enable signal Vo is asserted by the voltage comparator circuit 206 (e.g., Vo=HIGH) to indicate presence (or start) of the first-type ESD event (e.g., slow ESD event) when the input voltage Vin (i.e., Vin=VDD1) is higher than the reference voltage Vref, and is de-asserted by the voltage comparator circuit 206 (e.g., Vo=LOW) to indicate absence (or end) of the first-type ESD event (e.g., slow ESD event) when the input voltage Vin (i.e., Vin=VDD1) is not higher than the reference voltage Vref. With a proper setting of the reference voltage Vref, the first-type ESD event (e.g., slow ESD event) on the ESD-protected supply voltage VDD1 can be detected through comparing the ESD-protected supply voltage VDD1 and the reference voltage Vref. Specifically, since the additional supply voltage VDD used by the reference voltage generator circuit 202 is independent of the ESD-protected supply voltage VDD1, the reference voltage Vref can be freely adjusted to set the ESD turn-on voltage that meets a requirement of any ESD design.

Regarding the frequency detection circuit 108 shown in FIG. 1, it is arranged to detect occurrence of a second-type ESD event (e.g., a fast ESD event resulting from a short-duration ESD pulse) on the ESD-protected supply voltage VDD1 according to a time-domain change of the ESD-protected supply voltage VDD1, and assert the enable signal Vo in response to the second-type ESD event being detected on the ESD-protected supply voltage VDD1. For example, the frequency detection circuit 108 may be implemented using any conventional frequency-detection-based ESD trigger design, such as a resistor-capacitor (RC) based circuit. To put it simply, the present invention has no limitations on the circuit design of the frequency detection circuit 108. Further description of the frequency detection circuit 108 is omitted here for brevity.

The trigger circuit 110 is arranged to control activation of ESD protection for the ESD-protected supply voltage VDD1 according to the enable signal Vo. In this embodiment, the trigger circuit 110 is arranged to control activation of ESD protection for the ESD-protected supply voltage VDD1 according to the enable signal Vo that can be asserted by any of the voltage detection circuit 106 and the frequency detection circuit 108. In other words, the enable signal Vo is jointly controlled by the voltage detection circuit 106 and the frequency detection circuit 108. The trigger circuit 110 may be implemented using any conventional trigger circuit design, and the ESD clamp circuit 104 (which is responsible for applying ESD protection to ESD-protected supply voltage VDD1 when activated by the trigger circuit 110) may be implemented using any conventional ESD clamp circuit design. For example, the trigger circuit 110 may be implemented using an inverter, and the ESD clamp circuit 104 may be implemented using one or more clamp transistors. To put it simply, the present invention has no limitations on the circuit designs of the trigger circuit 110 and the ESD clamp circuit 104. Further description of the trigger circuit 110 and the ESD clamp circuit 104 is omitted here for brevity. Furthermore, due to integration of the voltage detection circuit 106 and the frequency detection circuit 108, the ESD trigger circuit 102 can cover a full range of ESD events, including frequency-detected ESD events (e.g., fast ESD events) and voltage-detected ESD events (e.g., slow ESD events).

The proposed ESD trigger circuit 102 can be employed by any ESD protection apparatus. For better comprehension of technical features of then present invention, several examples are provided as below.

Figure 4:
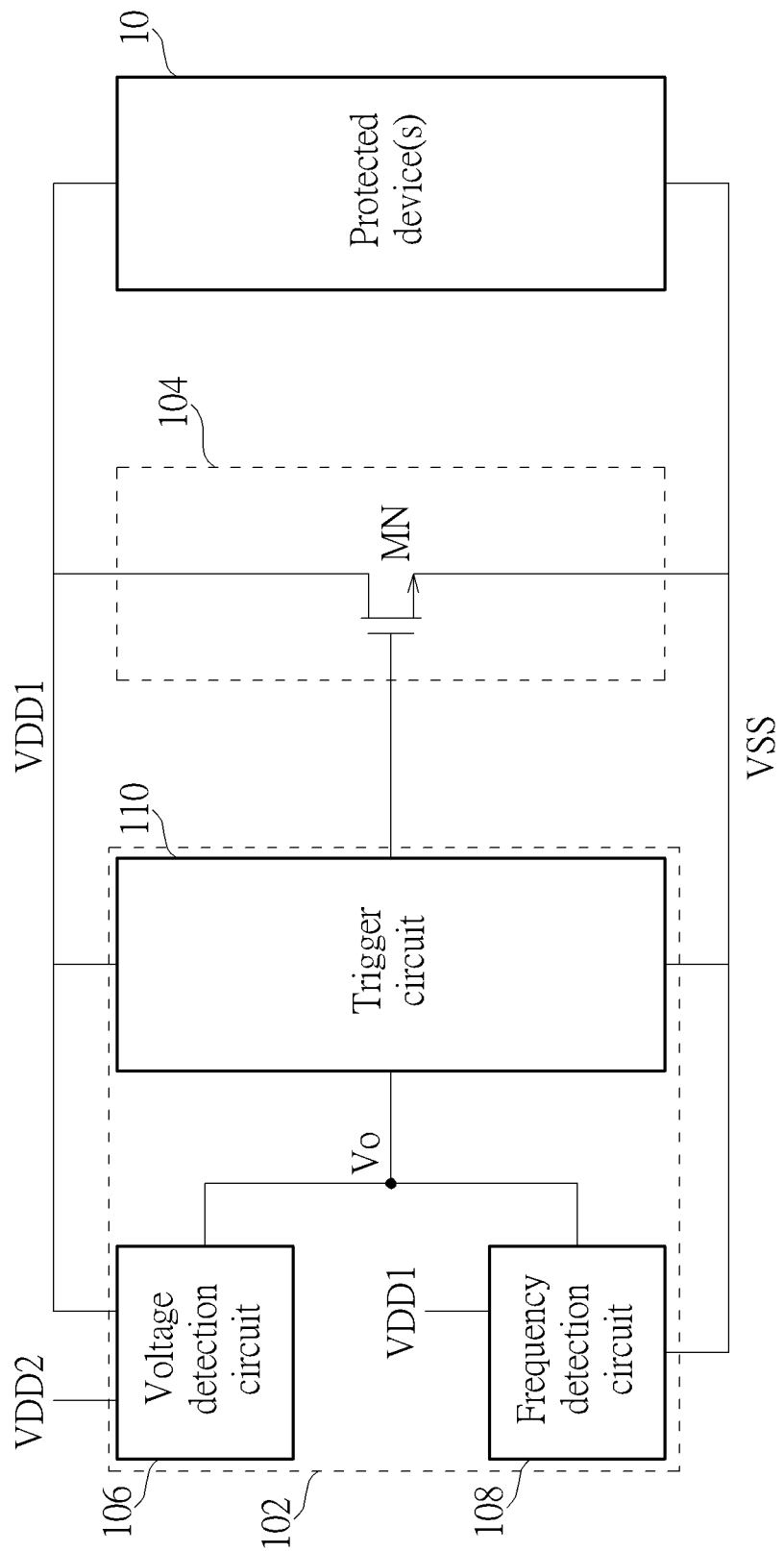
FIGS. 4-11 are diagrams illustrating different ESD protection designs, each using the proposed ESD trigger circuit, according to embodiments of the present invention.
Figure 5:
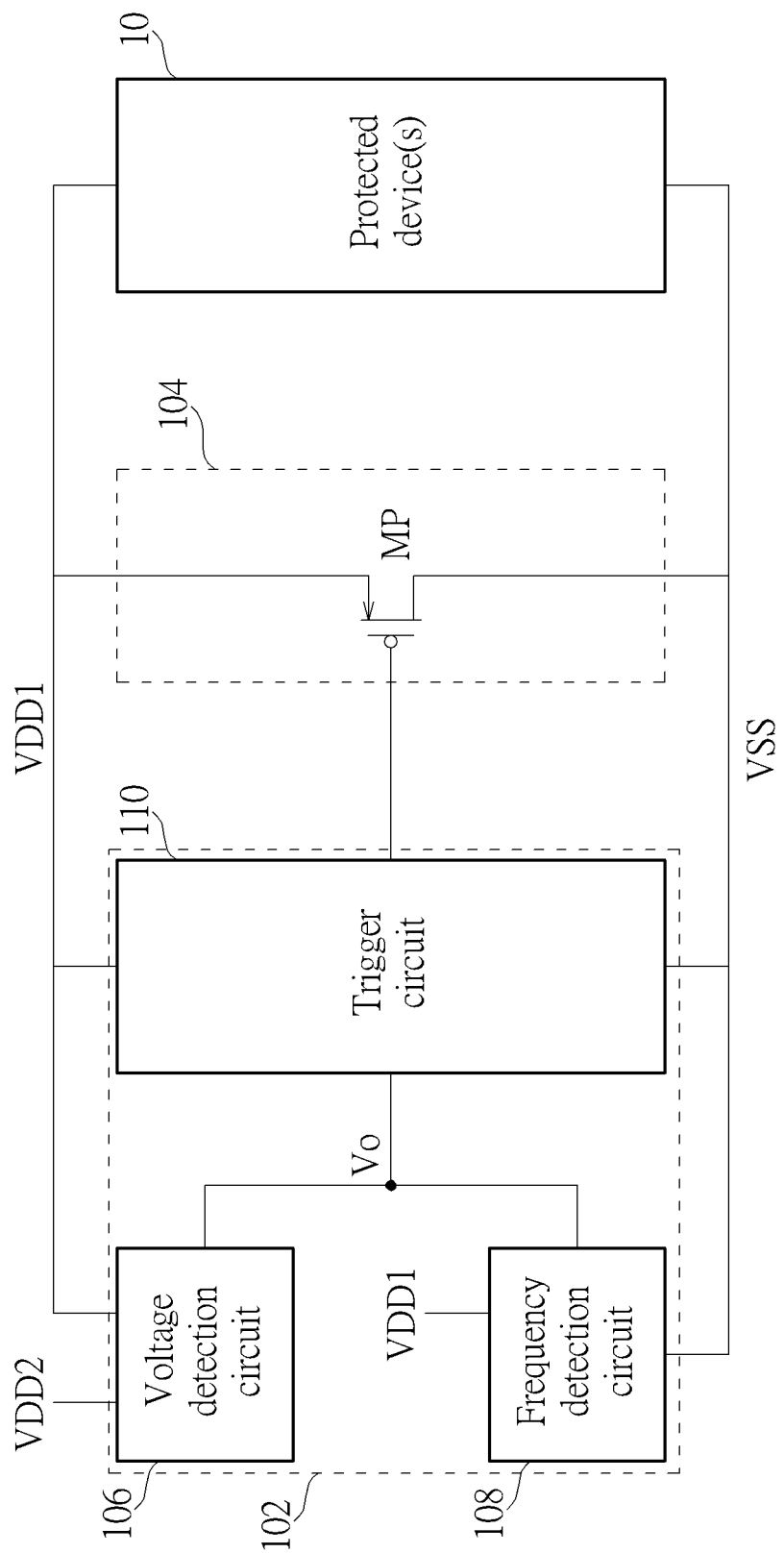
Figure 6:
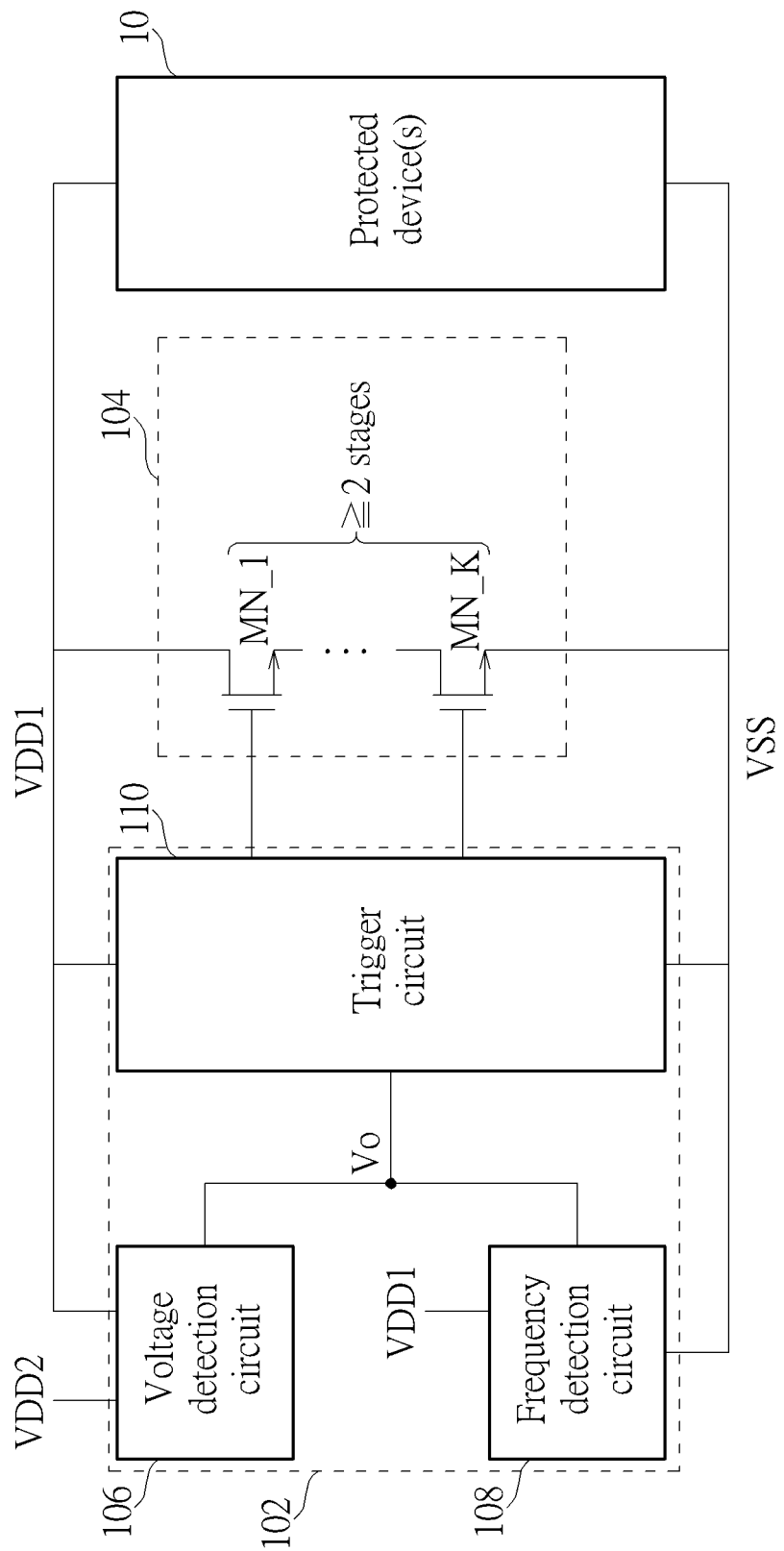
Figure 7:
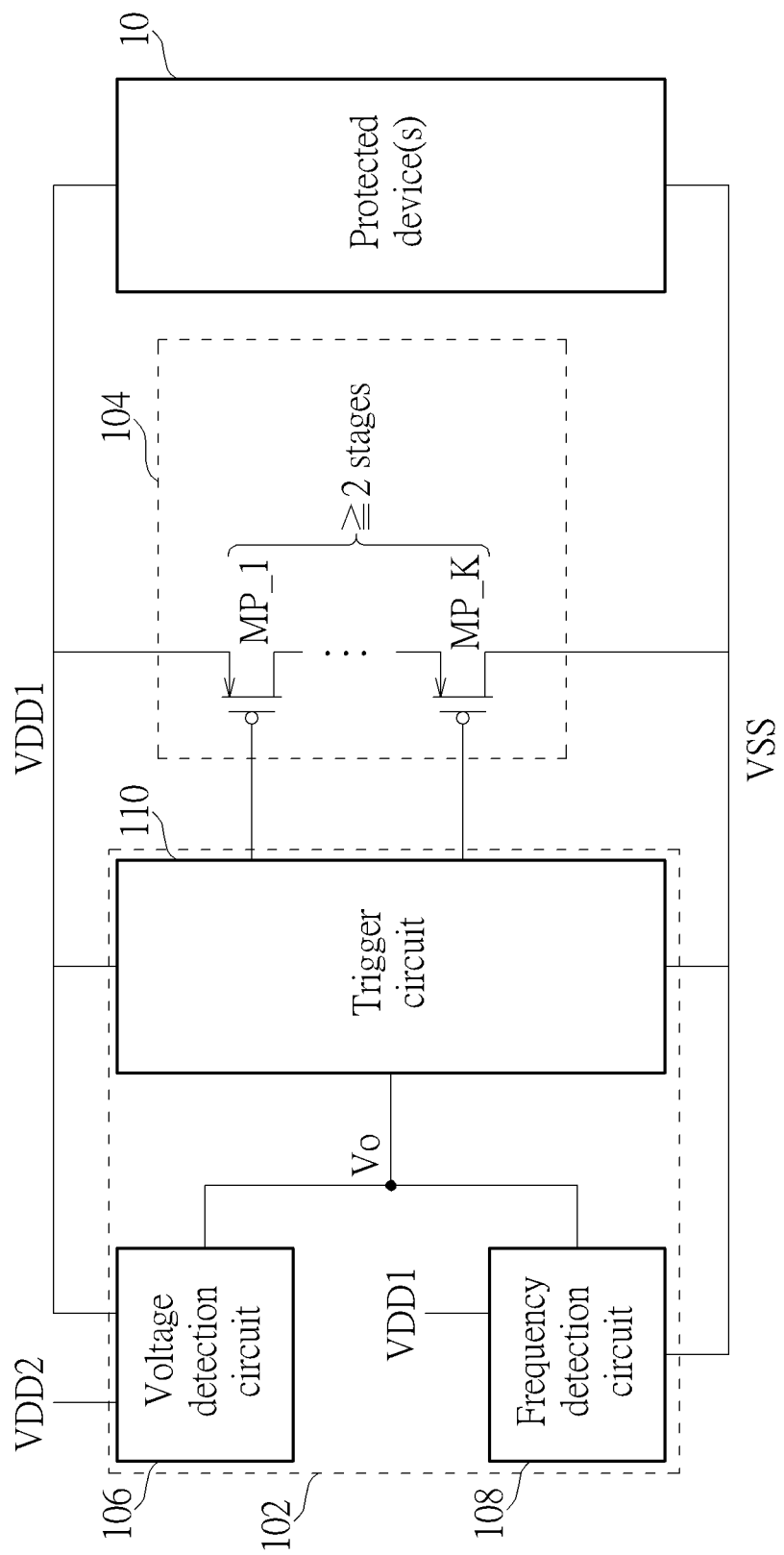
Figure 8:
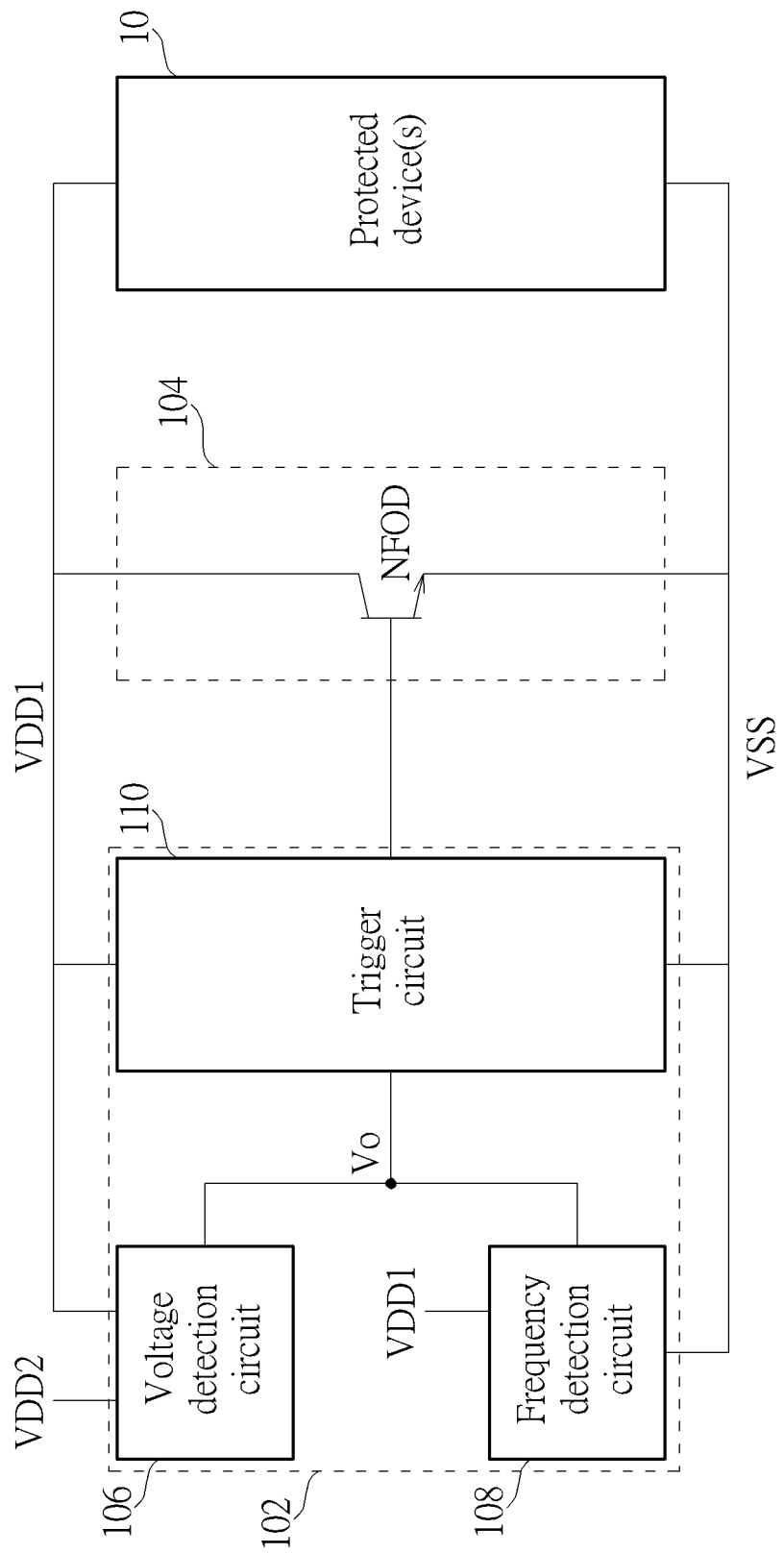
Figure 9:
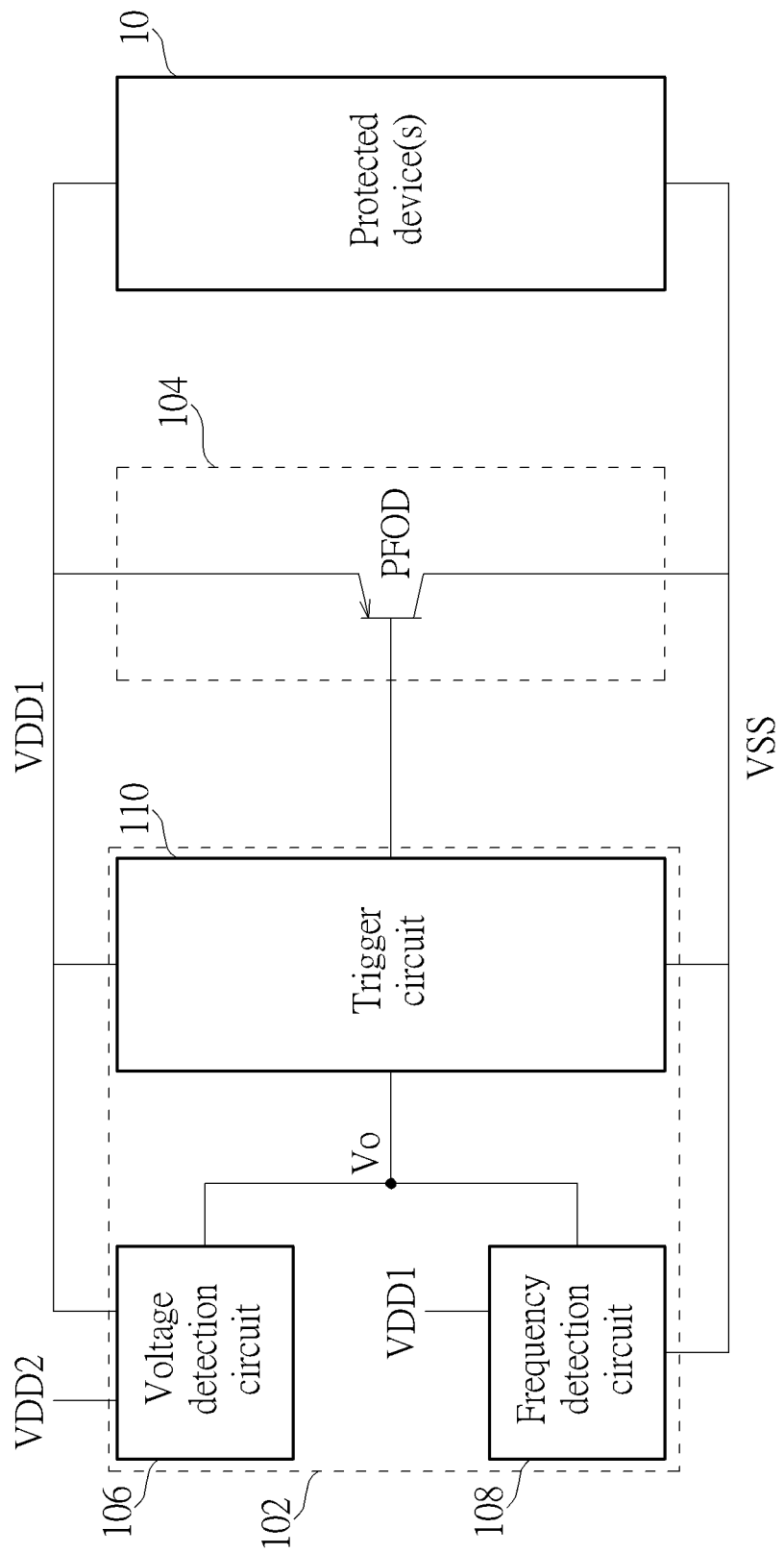
Figure 10:
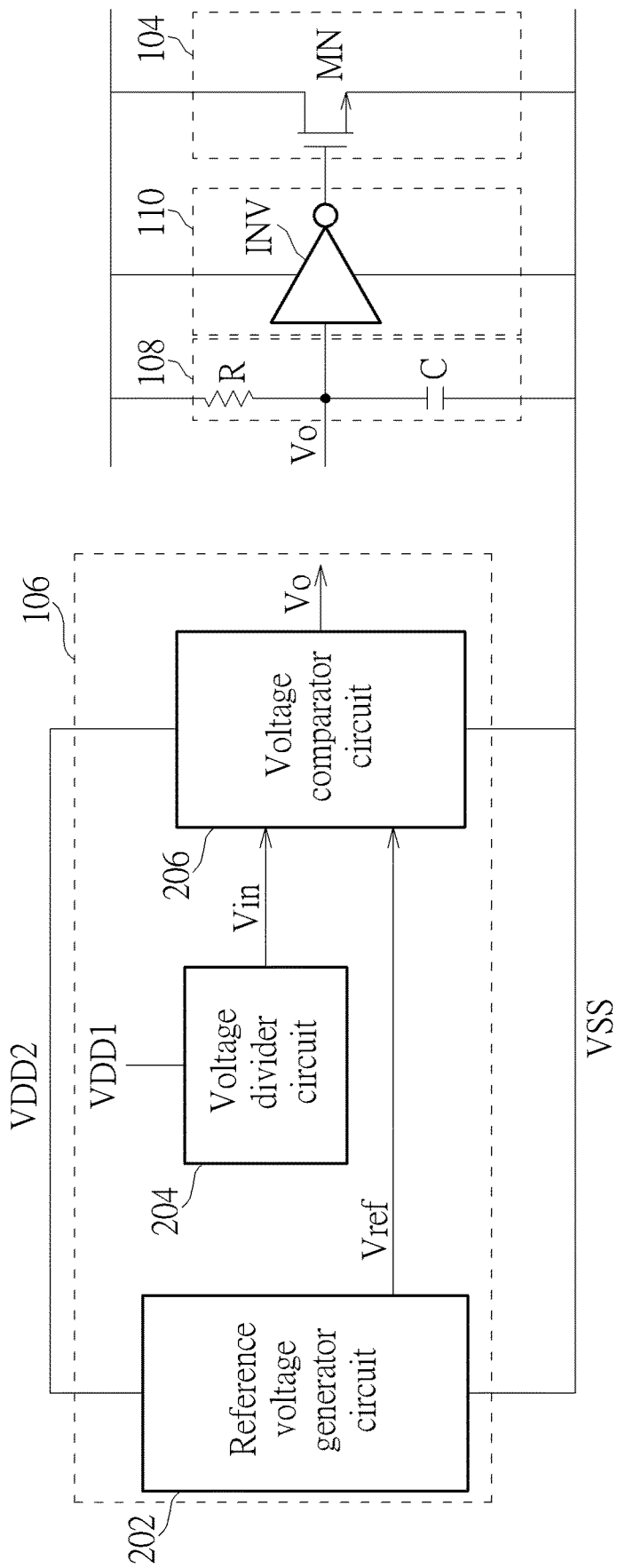
Figure 11:
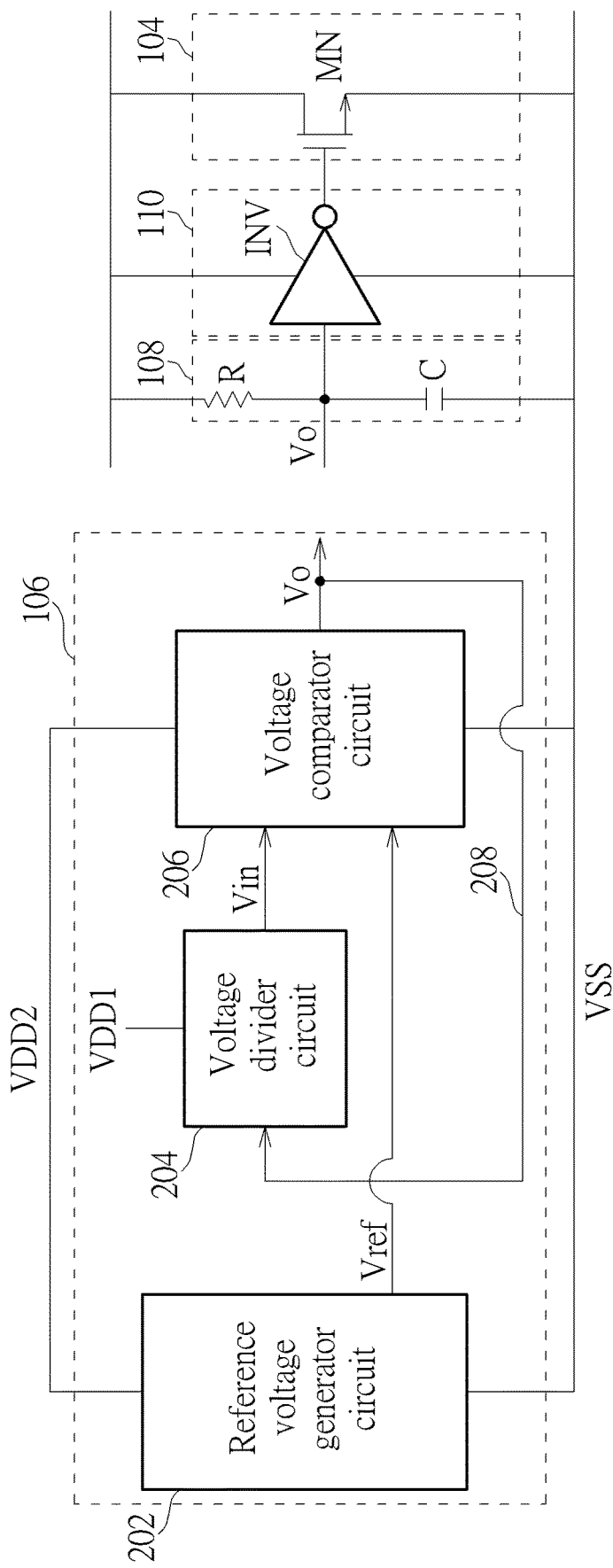

FIGS. 4-11 are diagrams illustrating different ESD protection designs, each using the proposed ESD trigger circuit 102, according to embodiments of the present invention. As shown in FIG. 4, the ESD trigger circuit 102 may be used to control activation of the ESD clamp circuit 104 having one clamp transistor implemented using an N-channel metal-oxide-semiconductor (NMOS) transistor MN. As shown in FIG. 5, the ESD trigger circuit 102 may be used to control activation of the ESD clamp circuit 104 having one clamp transistor implemented using a P-channel metal-oxide-semiconductor (PMOS) transistor MP. As shown in FIG. 6, the trigger circuit 110 may be a multi-stage trigger circuit used to control activation of the ESD clamp circuit 104 having K (K≥2) clamp transistors implemented using NMOS transistors MN_1-MN_K. As shown in FIG. 7, the trigger circuit 110 may be a multi-stage trigger circuit used to control activation of the ESD clamp circuit 104 having K (K≥2) clamp transistors implemented using PMOS transistors MP_1-MP_K. As shown in FIG. 8, the ESD trigger circuit 102 may be used to control activation of the ESD clamp circuit 104 having one clamp transistor implemented using an N-type field oxide device NFOD. As shown in FIG. 9, the ESD trigger circuit 102 may be used to control activation of the ESD clamp circuit 104 having one clamp transistor implemented using a P-type field oxide device PFOD. As shown in FIG. 10, the voltage detection circuit 106 may be implemented using the aforementioned reference voltage generator circuit 202, voltage divider circuit 204 and voltage comparator circuit 206 shown in FIG. 2, the frequency detection circuit 108 may be implemented using a resistor R and a capacitor C, the trigger circuit 110 may be implemented using an inverter INV, and the ESD clamp circuit 104 may be implemented using an NMOS transistor MN. As shown in FIG. 11, the voltage detection circuit 106 may be implemented using the aforementioned reference voltage generator circuit 202, voltage divider circuit 204, voltage comparator circuit 206 and feedback path 208 shown in FIG. 2, the frequency detection circuit 108 may be implemented using a resistor R and a capacitor C, the trigger circuit 110 may be implemented using an inverter INV, and the ESD clamp circuit 104 may be implemented using an NMOS transistor MN.

As mentioned above, the voltage detection circuit 106 and the frequency detection circuit 108 are integrated in the same ESD trigger circuit 102 to cover a full range of ESD events, including frequency-detected ESD events (e.g., fast ESD events) and voltage-detected ESD events (e.g., slow ESD events). However, this is for illustrative purposes only, and is not meant to be a limitation of the present invention. In practice, any ESD apparatus using the proposed voltage detection circuit to cover voltage-detected ESD events (e.g., slow ESD events) also falls within the scope of the present invention.

Figure 12:
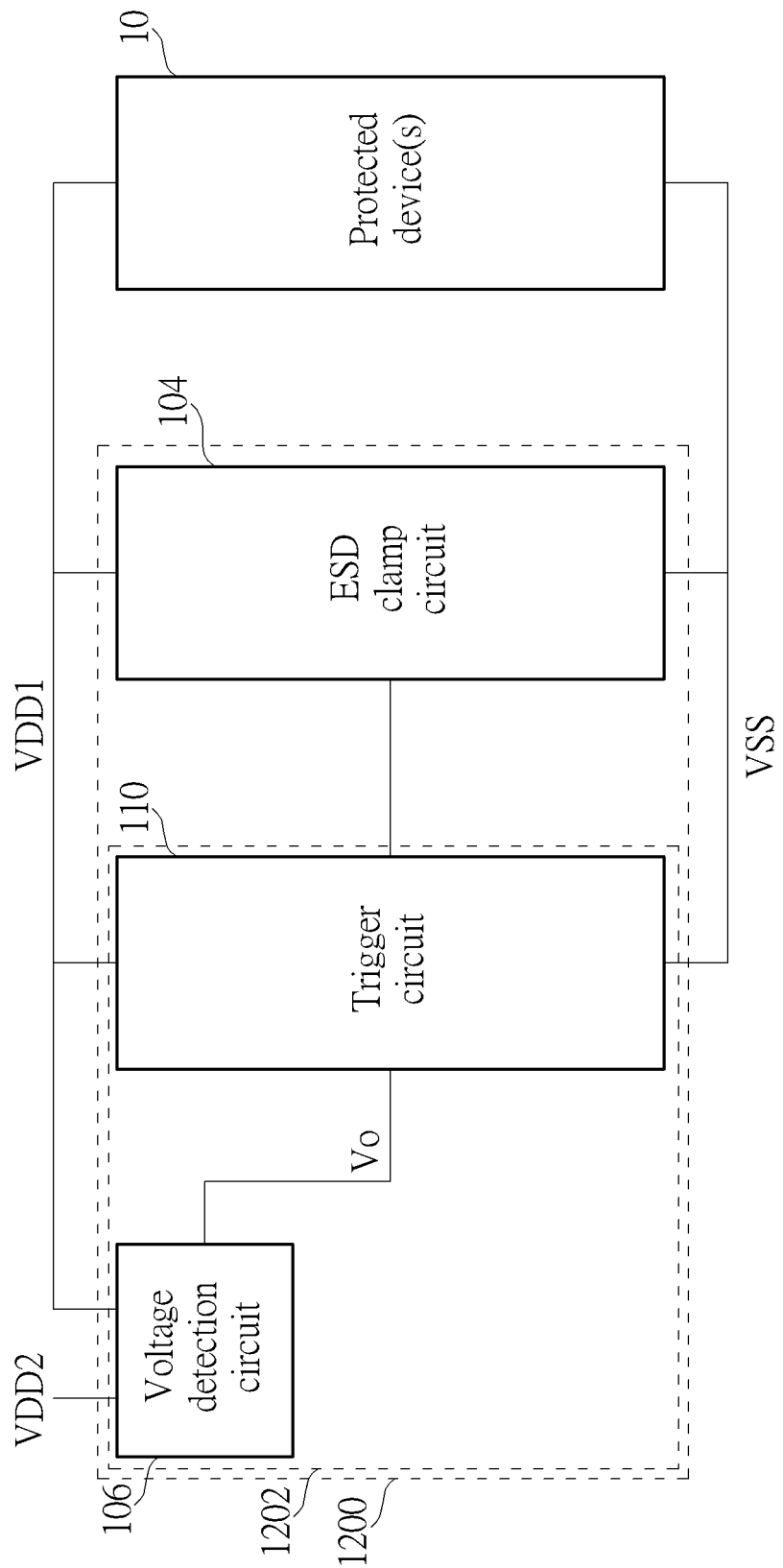
FIG. 12 is a diagram illustrating another ESD protection apparatus according to an embodiment of the present invention.

FIG. 12 is a diagram illustrating another ESD protection apparatus according to an embodiment of the present invention. The ESD protection apparatus 1200 is used employed to provide ESD protection for one or more protected devices 10 coupled between the ESD-protected supply voltage VDD1 and the ground voltage VSS, and includes an ESD trigger circuit 1202 and the aforementioned ESD clamp circuit 104. The major difference between the ESD trigger circuits 102 and 1202 is that the ESD trigger circuit 1202 does not include the aforementioned frequency detection circuit 108. Hence, the enable signal Vo is controlled by the voltage detection circuit 106 only, where the voltage detection circuit 106 may be implemented using the voltage detection circuit 200 shown in FIG. 2 or the voltage detection circuit 300 shown in FIG. 3. Since a person skilled in the art can readily understand details of the ESD trigger circuit 1202 after reading above paragraphs, further description is omitted here for brevity.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An electrostatic discharge (ESD) trigger circuit comprising:
   a voltage detection circuit, arranged to detect occurrence of an ESD event on an ESD-protected supply voltage according to the ESD-protected supply voltage and an additional supply voltage, and assert an enable signal in response to the ESD event being detected on the ESD-protected supply voltage, wherein the additional supply voltage is independent of the ESD-protected supply voltage; and
   a trigger circuit, arranged to control activation of ESD protection for the ESD-protected supply voltage according to the enable signal;
   wherein the voltage detection circuit comprises:
     a reference voltage generator circuit, arranged to generate a reference voltage according to the additional supply voltage; and
     a voltage comparator circuit, arranged to set the enable signal by comparing an input voltage and the reference voltage, wherein the input voltage is derived from the ESD-protected supply voltage.

2. The ESD trigger circuit of claim 1, further comprising:
   a frequency detection circuit, arranged to detect occurrence of another ESD event on the ESD-protected supply voltage according to a time-domain change of the ESD-protected supply voltage, and assert the enable signal in response to said another ESD event being detected on the ESD-protected supply voltage;
   wherein the enable signal is jointly controlled by the voltage detection circuit and the frequency detection circuit.

3. The ESD trigger circuit of claim 1, wherein the input voltage is directly set by the ESD-protected supply voltage.

4. The ESD trigger circuit of claim 1, wherein the voltage detection circuit further comprises:
   a voltage divider circuit, arranged to generate a divided voltage according to the ESD-protected supply voltage, and output the divided voltage as the input voltage.

5. The ESD trigger circuit of claim 4, wherein the voltage divider circuit is further arranged to receive the enable signal via a feedback path between the voltage comparator circuit and the voltage divider circuit, and adjust a divider ratio of the divided voltage to the ESD-protected supply voltage in response to the enable signal being asserted.

6. An electrostatic discharge (ESD) triggering method comprising:
  detecting occurrence of an ESD event on an ESD-protected supply voltage according to the ESD-protected supply voltage and an additional supply voltage, wherein the additional supply voltage is independent of the ESD-protected supply voltage;
  asserting an enable signal in response to the ESD event being detected on the ESD-protected supply voltage; and
  controlling activation of ESD protection for the ESD-protected supply voltage according to the enable signal;
wherein detecting the occurrence of the ESD event on the ESD-protected supply voltage according to the ESD-protected supply voltage and the additional supply voltage comprises:
  generating a reference voltage according to the additional supply voltage; and
  setting the enable signal by comparing an input voltage and the reference voltage, wherein the input voltage is derived from the ESD-protected supply voltage.

7. The ESD triggering method of claim 6, further comprising:
  detecting occurrence of another ESD event on the ESD-protected supply voltage according to a time-domain change of the ESD-protected supply voltage;
wherein the enable signal is jointly controlled by detecting the occurrence of said another ESD event on the ESD-protected supply voltage according to the time-domain change of the ESD-protected supply voltage and detecting the occurrence of the ESD event on the ESD-protected supply voltage according to the ESD-protected supply voltage and the additional supply voltage.

8. The ESD triggering method of claim 7, wherein detecting the occurrence of the ESD event on the ESD-protected supply voltage according to the ESD-protected supply voltage and the additional supply voltage further comprises:
  directly setting the input voltage by the ESD-protected supply voltage.

9. The ESD triggering method of claim 7, wherein detecting the occurrence of the ESD event on the ESD-protected supply voltage according to the ESD-protected supply voltage and the additional supply voltage further comprises:
  generating a divided voltage according to the ESD-protected supply voltage; and
  outputting the divided voltage as the input voltage.

10. The ESD triggering method of claim 9, wherein generating the divided voltage according to the ESD-protected supply voltage comprises:
  adjusting a divider ratio of the divided voltage to the ESD-protected supply voltage in response to the enable signal being asserted.

* * * * *